(12) United States Patent
Tian et al.

(10) Patent No.: US 7,686,558 B2
(45) Date of Patent: Mar. 30, 2010

(54) ARRANGEMENT SCHEME OF A CONTAINER WHARF AND THE CONTAINER LOADING/UNLOADING PROCESS

(75) Inventors: Hong Tian, Shanghai (CN); Hao Lin, Shanghai (CN)

(73) Assignees: Shanghai Zhenhua Port Machinery Co., Ltd., Shanghai (CN); No. 3 Transportation Engineering Perambulation and Design Institue of Ministry of Traffic, Shanghai (CN)

( * ) Notice: Subject to any disclaimer, the term of this patent is extended or adjusted under 35 U.S.C. 154(b) by 200 days.

(21) Appl. No.: 11/580,700

(22) Filed: Oct. 13, 2006

(65) Prior Publication Data

US 2007/0248444 A1    Oct. 25, 2007

(30) Foreign Application Priority Data

Apr. 20, 2006    (CN) .................... 2006 1 0025860

(51) Int. Cl.
  *B63B 27/00*    (2006.01)
  *B65G 67/60*    (2006.01)
(52) U.S. Cl. .................. 414/139.9; 414/140.3; 414/803
(58) Field of Classification Search ............. 414/139.4, 414/139.8, 139.9, 140.1, 140.3, 140.4, 342, 414/562, 584
See application file for complete search history.

(56) References Cited

U.S. PATENT DOCUMENTS

| | | | | |
|---|---|---|---|---|
| 3,075,479 | A | * | 1/1963 | Goby .............................. 410/1 |
| 3,689,106 | A | | 9/1972 | Yong |
| 3,700,128 | A | * | 10/1972 | Noble et al. ................. 414/231 |
| 3,704,796 | A | | 12/1972 | Dedons et al. |
| 3,754,669 | A | * | 8/1973 | Alsen ....................... 414/140.8 |
| 3,788,606 | A | | 1/1974 | Solter |

(Continued)

FOREIGN PATENT DOCUMENTS

CN    2225462    4/1996

(Continued)

OTHER PUBLICATIONS

Office Action mailed on Nov. 13, 2007 and received in the co-pending patent application U.S. Appl. No. 11/360,463, filed Feb. 23, 2006.

*Primary Examiner*—Gregory W Adams
(74) *Attorney, Agent, or Firm*—Dorsey & Whitney LLP

(57) ABSTRACT

The present invention discloses an arrangement scheme of a container wharf, in which the containers positioned in the yard is arranged in a direction being perpendicular to the direction of the containers positioned in the ship, comprising: a quayside container crane for loading/unloading containers in the first direction; a low elevated system including low elevated track, low elevated system lifting trolley and low elevated system plane carriers, the low elevated system plane carrier can be operated by the low elevated system lifting trolley and the low elevated system can be operated by the quayside container crane; a transportation carriers system including transportation carrier track along the second direction and transportation carriers being able to rotate 90 degrees together with container put thereon, the transportation system can be operated by the low elevated system; a yard crane having a yard crane track along the second direction for loading/unloading the containers with the yard. The arrangement scheme of the container wharf according to the present invention increases the efficiency and technical level of the container handling port significantly.

9 Claims, 13 Drawing Sheets

U.S. PATENT DOCUMENTS

| | | | |
|---|---|---|---|
| 3,807,582 A | 4/1974 | Anderson | |
| 3,812,987 A | 5/1974 | Watatani | |
| 3,837,503 A | 9/1974 | Komatsu | |
| 3,888,536 A | 6/1975 | Durenec | |
| 4,035,010 A | 7/1977 | Kawashita et al. | |
| 4,244,615 A | 1/1981 | Brown | |
| 4,563,030 A | 1/1986 | Makino | |
| 4,682,926 A | 7/1987 | Chambers et al. | |
| 4,927,034 A | 5/1990 | Holden | |
| 4,973,219 A * | 11/1990 | Brickner et al. | 414/792.9 |
| 4,995,783 A | 2/1991 | Petitto et al. | |
| 5,039,275 A | 8/1991 | Ide | |
| 5,183,305 A | 2/1993 | Nordstrom et al. | |
| 5,671,912 A | 9/1997 | Langford et al. | |
| 5,718,550 A | 2/1998 | Lanigan et al. | |
| 5,775,866 A * | 7/1998 | Tax et al. | 414/140.3 |
| 5,871,249 A | 2/1999 | Williams | |
| 5,923,270 A | 7/1999 | Sampo et al. | |
| 5,951,226 A * | 9/1999 | Fantuzzi | 414/141.3 |
| 6,145,680 A | 11/2000 | Jussila et al. | |
| 6,243,649 B1 | 6/2001 | Wetherbee et al. | |
| 6,312,213 B1 | 11/2001 | Stinis | |
| 6,354,782 B1 | 3/2002 | Barry | |
| 6,554,121 B1 * | 4/2003 | Halbesma | 198/349 |
| 6,602,036 B2 | 8/2003 | Takehara et al. | |
| 6,698,990 B1 * | 3/2004 | Dobner et al. | 414/139.9 |
| 6,715,977 B2 * | 4/2004 | Dobner et al. | 414/141.3 |
| 6,920,963 B2 | 7/2005 | Faller | |
| 7,032,763 B1 | 4/2006 | Zakula, Sr. et al. | |
| 7,270,312 B1 | 9/2007 | Phipps | |
| 7,284,744 B1 | 10/2007 | Lerchenmueller et al. | |
| 2002/0044854 A1 | 4/2002 | Franzen et al. | |
| 2003/0168871 A1 | 9/2003 | Geis | |
| 2003/0189348 A1 | 10/2003 | Lindstrom | |
| 2004/0032140 A1 | 2/2004 | Solstad | |
| 2006/0043748 A1 | 3/2006 | Stinis et al. | |
| 2007/0134076 A1 * | 6/2007 | Tian | 414/139.4 |
| 2007/0217894 A1 * | 9/2007 | Tian et al. | 414/139.9 |

FOREIGN PATENT DOCUMENTS

| | | |
|---|---|---|
| CN | 1155664 | 7/1997 |
| CN | 2373421 | 4/2000 |
| CN | 1415529 | 5/2003 |
| CN | 1448331 | 10/2003 |
| CN | 2599327 | 1/2004 |
| CN | 2628508 | 7/2004 |
| CN | 1579916 | 2/2005 |
| DE | 1274299 B | 8/1968 |
| DE | 38 38 058 A1 | 1/1990 |
| EP | 302569 A1 * | 2/1989 |
| EP | 1 650 156 A | 5/1990 |
| FR | 828297 A | 5/1938 |
| GB | 876647 | 9/1961 |
| JP | 55 035722 | 3/1980 |
| JP | 8 175784 A | 7/1996 |
| JP | 9-267987 | 10/1997 |
| JP | 10-324493 | 12/1998 |
| JP | 2001/240372 A | 9/2001 |
| JP | P200268481 A | 3/2002 |
| WO | WO 98/34127 | 8/1998 |
| WO | WO 01/58797 A1 | 8/2001 |
| WO | WO 01/98195 A1 | 12/2001 |
| WO | WO 2005/009885 A1 | 2/2005 |

* cited by examiner

ARRANGEMENT SCHEME OF A CONTAINER WHARF AND THE CONTAINER LOADING/UNLOADING PROCESS

CROSS-REFERENCE TO RELATED APPLICATION

This application claims priority to Chinese Patent Application Number CN200610025860.6, filed on Apr. 20, 2006, the content of which is incorporated in its entirety by reference herein.

FIELD OF INVENTION

The present invention relates to container loading/unloading technique at a container wharf, more particularly, to an arrangement scheme of a container wharf and the container loading/unloading process.

BACKGROUND OF INVENTION

Bloom requirements for container transportation and throughput at container ports are continuously growing in the world, which have newer and higher requirements for devices for container handling technique as well as process for loading/unloading techniques. Therefore, it is a pressing demand for developing and designing devices for container handling with high efficiency so as to meet requirements of scale, high-speed and automation of container transportation of wharf.

Since the 1990s, with growth of global economy and trade, freight volume of containers steeply rises. With promotion of strong transportation requirements and good benefit of technique and economy, hi-tech technique for crane mechanism of containers, particularly automatic control technique, has fully developed. However, the handling systems of the container wharf used at present have the following deficiencies:

Generally speaking, a container wharf can be divided into two parts: front of wharf (quayside) and rear of wharf (container yard). The container crane at front of wharf is used to hoist containers from a container ship and the container yard at the rear of the wharf is used to stack the containers. There are two schemes for the arrangement of the containers stacked on the yard: One is that the containers on the yard are arranged in the same direction of containers on the ship, it should be noted that the direction of the containers used here and below refers to the long axis of the containers. The other scheme of the arrangement of the containers stacked on the yard is that the containers on the yard are arranged in a different direction of containers on the ship. In recent years, in order to increase usage of crane at the container yard and to enhance work efficiency at the container yard, the later scheme is more and more used, that is: the containers on the yard are arranged in a direction perpendicular to the direction of the containers on the ship.

At present, the transportation between front and rear of wharf is achieved by flat carriers driven by gas engine. That is, for the unloading process, the containers are lifted from the ship to the flat carrier by a quayside container crane, then transported to the container yard by the flat carriers, and hoisted from the flat carriers and put on the yard by a yard crane, and for the loading process, the containers are lifted to the from the yard to the flat carrier by a yard crane, then transported to the position under the quayside container crane by the flat carriers, and hoisted from the flat carriers and loaded on the ship by a quayside container crane. However, in the above process, the following problems will arise:

1) The flat carriers travels freely on road and are difficult to be in a precise direction as the carriers traveling on tracks, which will cause difficulties for cranes hoisting and will affect the handling speed;
2) The flat carriers need to be driven by persons, which is a disadvantage for complete automation;
3) The flat carriers are driven by gas engine that produces great pollution.

Thus, to address the above shortcomings, the object of the present invention is to provide an efficient arrangement scheme of a container wharf for transporting, loading, unloading and stacking containers efficiently.

SUMMARY OF INVENTION

The object of the invention is to provide an efficient arrangement scheme of a container wharf for transporting, loading, unloading and stacking containers efficiently.

According to a first aspect of the present invention, providing an arrangement scheme of a container wharf, in which the containers positioned in the yard is arranged in a direction being perpendicular to the direction of the containers positioned in the ship, the scheme comprises:

a quayside container crane having trolleys for loading/unloading the containers with the ship and loading/unloading the containers with the low elevated system, wherein the containers positioned in the ship are arranged in the first direction and are kept in the first direction during the operation of the quayside container crane, the trolleys of the quayside container crane move along a second direction that is perpendicular to the first direction;

a low elevated system including at least one group of low elevated track along the first direction, and said at least one group of low elevated track including at least one low elevated system lifting trolley moving along the low elevated track for loading/uploading the containers with the low elevated system plane carriers being positioned between each group of the low elevated track, wherein the low elevated track is configured to make the low elevated system plane carriers be able to reach the position that the containers can be operated by the trolleys of the quayside container crane;

a transportation carriers system including at least one group of transportation carrier track along the second direction, wherein the transportation carrier track aligns with the channels between containers in the yard and extends through the yard, the transportation carrier track also extends to the position below the low elevated system, the transportation carriers system also includes the transportation carriers moving along the transportation carrier track and being able to rotate 90 degrees together with container put thereon, the transportation carrier track is configured to make the transportation carriers be able to reach the position that containers can be operated by the low elevated system lifting trolley, the transportation carrier track is also configured to make the transportation carriers and the low elevated system plane carriers have a different altitude;

a yard crane having a yard crane track along the second direction and moving on the yard crane track, the containers positioned in the yard are arranged in the second direction and can be operated by the yard crane, wherein the yard crane track is configured to make the yard crane be able to reach the position for the containers to be operated by the transportation carriers; when loading the containers to the ship, the yard crane lifts the containers being arranged in the second direction from the yard, the transportation carriers move along the transportation track to the position below the yard crane, the yard crane then put the container on the transportation carriers, the transportation carriers move along the transportation track to the position below the low elevated system and rotate 90 degrees to make the containers in the first direction, the low elevated system lifting trolley lifts the containers to the low elevated system plane carriers and the low elevated system plane carriers move along the low elevated track to the position below the trolley of the quayside container crane, the trolley of the quayside container crane lifts the containers from the low elevated system plane carriers and loads them to the ship; when unloading the containers from the ship, the trolley of the quayside container crane lifts the containers being arranged in the first direction from the ship and put them on the low elevated system plane carriers, the low elevated system plane carriers move along the low elevated track to the position for transferring the containers to the transportation carriers and lifts the containers to the transportation carriers by the low elevated system lifting trolley, then the transportation carriers rotate 90 degrees and make the containers in the second direction and move along the transportation carrier track to the position below the yard crane, the yard crane lifts the containers from the transportation carriers and put them in the yard.

The transportation carrier comprises:

a bottom frame;

a set of wheels, mounted on said bottom frame, said set of wheels being positioned on a set of tracks so that said container transportation trolley travels along the tracks;

a wheel driving means, mounted on said bottom frame, for driving said set of wheels;

a rotary mechanism, mounted on said bottom frame, being rotatable with respect to said bottom frame;

a rotary platform, spanned on said rotary mechanism by rotary supporting means, with containers positioned on said rotary platform;

a rotary driving means, mounted on said bottom frame, for driving said rotary mechanism to rotate said rotary platform.

Preferably, the wheel driving means is one selected from the group including: electric means, hydraulic power transmission means and aerodynamic means.

Preferably, the set of wheels comprises four sets of wheels, positioned at the left side and the right side of said bottom frame, respectively, and the distance between the trolley tracks is the same as that between the sets of wheels at both sides of said bottom frame.

Preferably, the rotary mechanism is cylindrical, being positioned at center of said bottom frame which aligns with the center of said rotary platform.

Preferably, the rotary supporting means comprises supporting pieces at the circumference of the cylindrical rotary mechanism.

According to an embodiment, the number of the low elevated tracks, the low elevated lifting trolleys and the low elevated system plane carries match the number of the quayside container cranes, wherein a matching number of the low elevated tracks, the low elevated lifting trolleys and the low elevated system plane carries serve one quayside container crane.

Preferably, the low elevated system further comprises: reserve low elevated tracks, reserve low elevated system lifting trolleys and reserve low elevated system plane carriers.

Preferably, the low elevated system is configured to make the quayside container crane be able to load/unload containers with trucks below directly.

According to a second aspect of the present invention, providing an arrangement scheme of a container wharf, in which the containers positioned in the yard is arranged in a direction being perpendicular to the direction of the containers positioned in the ship, the scheme comprises:

a quayside container crane having trolleys for loading/unloading the containers with the ship and loading/unloading the containers with the low elevated system, wherein the containers positioned in the ship are arranged in the first direction and are kept in the first direction during the operation of the quayside container crane, the trolleys of the quayside container crane move along a second direction that is perpendicular to the first direction;

a low elevated system including at least one group of low elevated track along the first direction, and said at least one group of low elevated track including at least one low elevated system lifting trolley moving along the low elevated track for loading/uploading the containers with the low elevated system plane carriers being positioned between each group of the low elevated track, wherein the low elevated track is configured to make the low elevated system plane carriers be able to reach the position that the containers can be operated by the trolleys of the quayside container crane;

a transportation carriers system including at least one group of transportation carrier track along the second direction, wherein the transportation carrier track aligns with the containers in the yard and extends to one end of the yard but do not enter the yard, the transportation carrier track also extends to the position below the low elevated system, the transportation carriers system also includes the transportation carriers moving along the transportation carrier track and being able to rotate 90 degrees together with container put thereon, the transportation carrier track is configured to make the transportation carriers be able to reach the position that containers can be operated by the low elevated system lifting trolley, the transportation carrier track is also configured to make the transportation carriers and the low elevated system plane carriers have a different altitude;

a yard crane having a yard crane track along the second direction and moving on the yard crane track, the containers positioned in the yard are arranged in the second direction and can be operated by the yard crane, wherein the yard crane track is configured to make the yard crane be able to reach the position for the containers to be operated by the transportation carriers;

when loading the containers to the ship, the yard crane lifts the containers being arranged in the second direction from the yard, the transportation carriers move along the transportation track to the position below the yard crane, the yard crane then put the container on the transportation carriers, the transportation carriers move along the transportation track to the position below the low elevated system and rotate 90 degrees to make the containers in the first direction, the low elevated system lifting trolley lifts the containers to the low elevated system plane carriers and the low elevated system plane carriers move along the low elevated track to the position below the trolley of the quayside container crane, the trolley of the quayside container crane lifts the containers from the low elevated system plane carriers and loads them to the ship;

when unloading the containers from the ship, the trolley of the quayside container crane lifts the containers being arranged in the first direction from the ship and put them on the low elevated system plane carriers, the low elevated system plane carriers move along the low elevated track to the position for transferring the containers to the transportation carriers and lifts the containers to the transportation carriers by the low elevated system lifting trolley, then the transportation carriers rotate 90 degrees and make the containers in the second direction and move along the transportation carrier track to the position below the yard crane, the yard crane lifts the containers from the transportation carriers and put them in the yard.

The transportation carrier comprises:
a bottom frame;
a set of wheels, mounted on said bottom frame, said set of wheels being positioned on a set of tracks so that said container transportation trolley travels along the tracks;
a wheel driving means, mounted on said bottom frame, for driving said set of wheels;
a rotary mechanism, mounted on said bottom frame, being rotatable with respect to said bottom frame;
a rotary platform, spanned on said rotary mechanism by rotary supporting means, with containers positioned on said rotary platform;
a rotary driving means, mounted on said bottom frame, for driving said rotary mechanism to rotate said rotary platform.

Preferably, the wheel driving means is one selected from the group including: electric means, hydraulic power transmission means and aerodynamic means.

Preferably, the set of wheels comprises four sets of wheels, positioned at the left side and the right side of said bottom frame, respectively, and the distance between the trolley tracks is the same as that between the sets of wheels at both sides of said bottom frame.

Preferably, the rotary mechanism is cylindrical, being positioned at center of said bottom frame which aligns with the center of said rotary platform.

Preferably, the rotary supporting means comprises supporting pieces at the circumference of the cylindrical rotary mechanism.

According to an embodiment, the number of the low elevated tracks, the low elevated lifting trolleys and the low elevated system plane carries match the number of the quayside container cranes, wherein a matching number of the low elevated tracks, the low elevated lifting trolleys and the low elevated system plane carries serve one quayside container crane.

Preferably, the low elevated system further comprises: reserve low elevated tracks, reserve low elevated system lifting trolleys and reserve low elevated system plane carriers.

Preferably, the low elevated system is configured to make the quayside container crane be able to load/unload containers with trucks below directly.

According to a third aspect of the present invention, providing a container loading/unloading process of a container wharf, the container wharf is arranged according to the arrangement scheme mentioned above, the process comprising:

the loading process,
the yard crane lifts the containers being arranged in the second direction from the yard;
the transportation carriers moves along the transportation carrier track, or the yard crane moves along the yard crane track, or the transportation carriers and the yard crane moves simultaneously until the transportation carriers reach the position below the yard crane, and the yard crane puts the containers on the transportation carriers;
the transportation moves along the transportation carrier track to the position under the low elevated system track and rotate 90 degrees to make the containers in the first direction;
the low elevated system lifting trolley lifts the containers to the low elevated system plane carriers, and the low elevated system plane carriers move along the low elevated track to the position under the trolley of the quayside container crane; the trolley of the quayside container crane lifts the containers from the low elevated system plane carriers and load them to the ship; unloading process,
the trolley of the quayside container crane lifts the containers being arranged in the first direction from the ship;
the trolley of the quayside container crane puts the containers to the low elevated system plane carriers, and the low elevated system plane carriers move along the low elevated track to the position for transferring the containers to the transportation carriers;
the low elevated system lifting trolley lifts the containers to the transportation carriers;
the transportation carriers rotate 90 degrees to make the containers in the second direction;
the transportation carriers moves along the transportation carrier track, or the yard crane moves along the yard crane track, or the transportation carriers and the yard crane moves simultaneously until the transportation carriers reach the position below the yard crane;
the yard crane lifts the containers from the transportation carriers and puts them on the yard.

Wherein, in the loading process, the transportation carriers rotating 90 degrees to make the containers in the first direction can be performed during the time period when the transportation leaves the end of the yard and reaches the position under the low elevated system track, or the rotating step can be performed when the transportation carriers reaches the position under the low elevated system track; and in the unloading process, the transportation carriers rotating 90 degrees to make the containers in the second direction can be performed during the time period when the transportation leaves the position under the low elevated system track and reaches the end of the yard, or the rotating step can be performed when the transportation carriers are at the position under the low elevated system track.

Using the technical solutions of the present invention, the speed of transportation between cranes at shore of container wharf and the cranes at the container yard will be significantly increased and the problem of the 90-degree rotation will be solved. In addition, the solution can be used at non-automatic wharfs, and, more preferably, at automatic wharfs. The advantage of efficient handling has created a new mode of operation for completely enhancing efficiency and technical level of the container handling port.

BRIEF DESCRIPTION OF DRAWINGS

The above or other features, natures or advantages of the present invention will be more obvious to the skilled person in the art by the following descriptions of the embodiments accompanying with the drawings, the same sign reference indicates the identical features throughout the description, and wherein.

DETAILED DESCRIPTION OF PREFERRED EMBODIMENTS

The main points of design of the present invention are: providing a low elevated system and a transportation system between the quayside container crane and the yard crane, implementing level transportation of containers by electric carriers traveling on tracks (including the low elevated system plane carriers and the transportation carriers), which may take containers from one place to another by traveling to and from in a horizontal direction and has a rotary platform thereon being rotatable clockwise or counter-clockwise on a plane with or without containers, so as to achieve 90-degree rotation for arrangement of containers between handling points at front of wharf and at container yard at rear of wharf.

According to the above points of design of the present invention, the present invention provides a low elevated system, a transportation system and an arrangement of the container wharf based thereon, so as to implement automatic and high-efficient transportation of containers.

For the purpose of conciseness and clarity, the direction of the containers on the ship will be regarded as the first direction and the direction of the container on the yard will be regarded as the second direction in the descriptions here below, wherein the first direction is perpendicular to the second direction.

Low Elevated System

Figure 5:
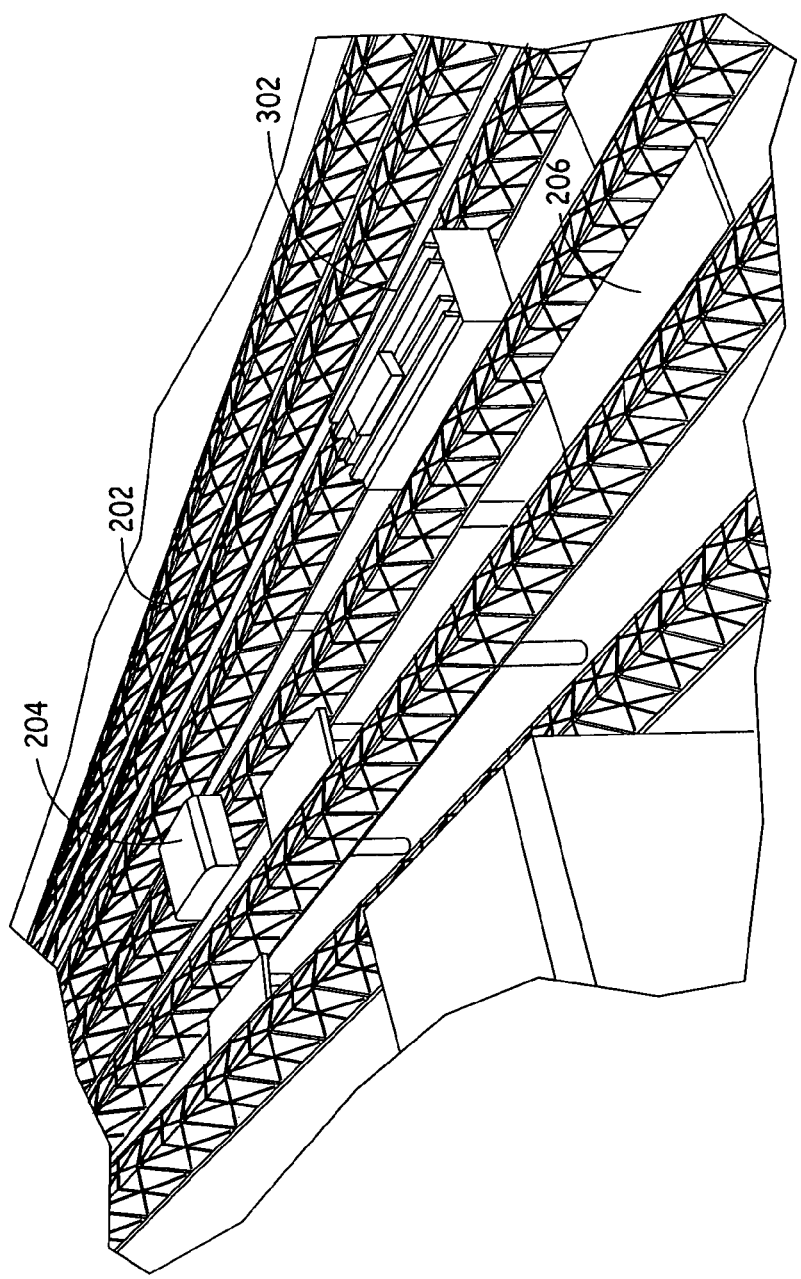
FIG. 5 shows the low elevated system according to an embodiment of the present invention.
Figure 8A:
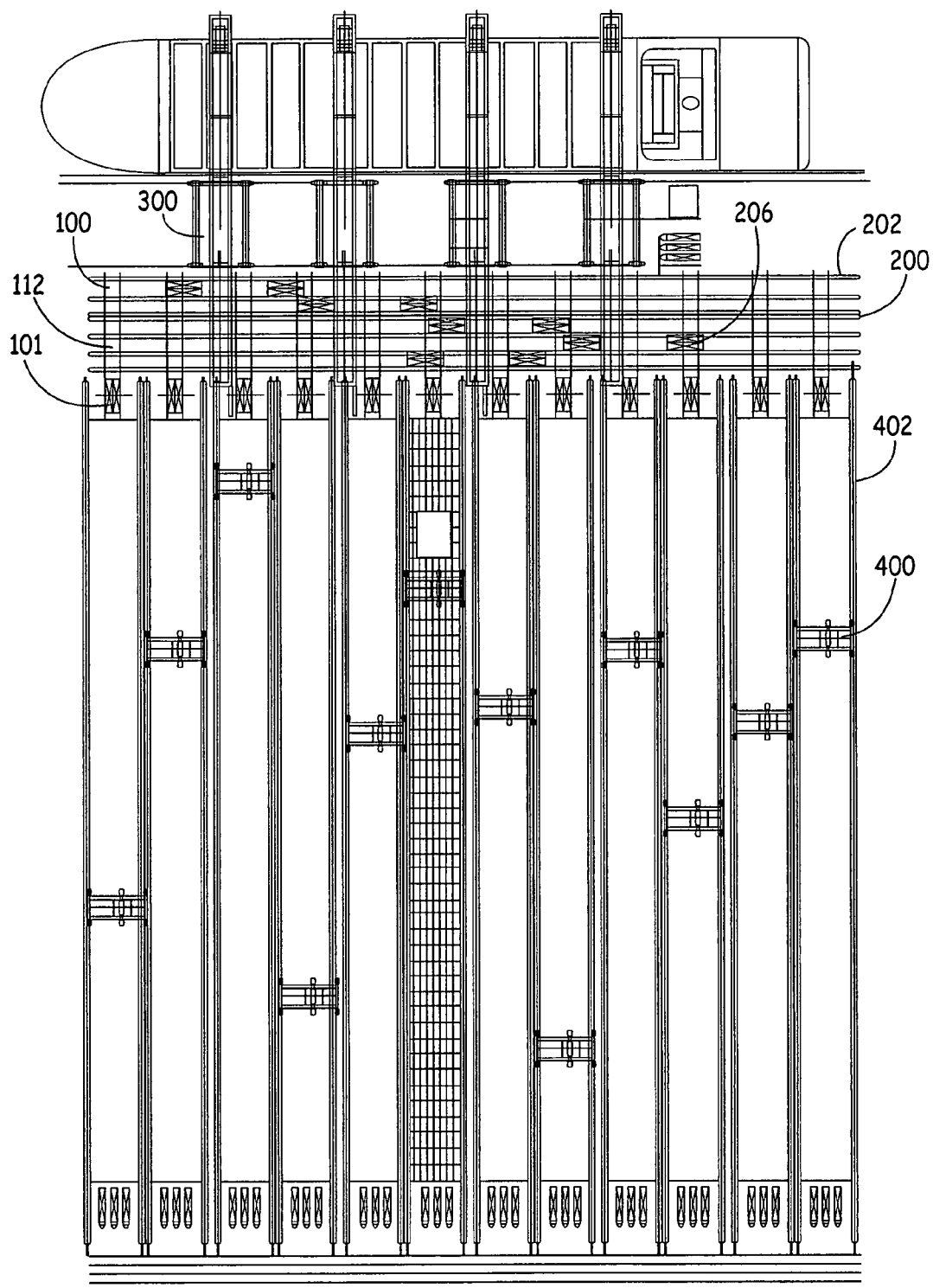
FIGS. 8A and 8B show the an arrangement scheme of a container wharf according to another embodiment of the present invention.
Figure 8B:
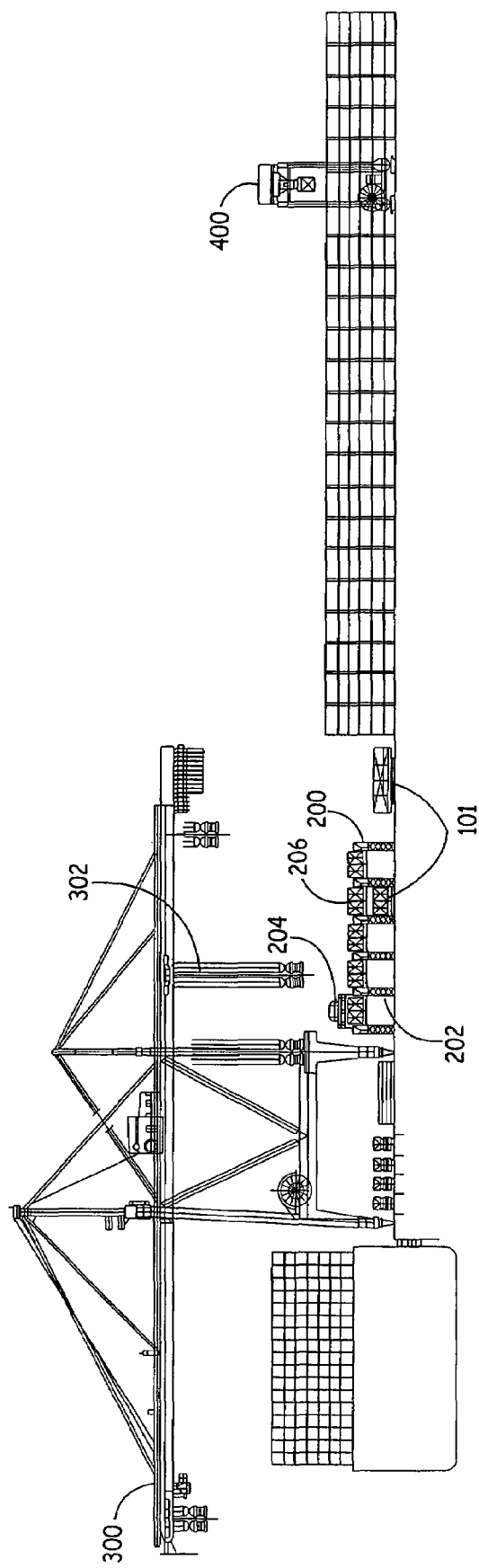

Refer to FIG. 5 and FIG. 8, which show a low elevated system 200 according to the present invention, comprising: at least one group of low elevated track 202 along the first direction, and said at least one group of low elevated track 202 including at least one low elevated system lifting trolley 204 moving along the low elevated track 202 for loading/uploading the containers with the low elevated system plane carriers 206 being positioned between each group of the low elevated track 202, wherein the low elevated track 202 is configured to make the low elevated system plane carriers 206 be able to reach the position that the containers can be operated by the trolleys of the quayside container crane.

As shown in FIG. 5 and FIG. 8, generally, the number of the low elevated tracks 202, the low elevated system lifting trolleys 204 and the low elevated system plane carriers 206 of the low elevated system 200 is equal to the number of the quayside container crane. One group of the low elevated tracks 202, one low elevated system lifting trolley 204 moving on the tracks and one low elevated system plane carrier 206 moving between the group of tracks serve one quayside container crane and are used specially for the loading/unloading operation of the quayside container crane. The groups of the low elevated tracks 202, the low elevated system lifting trolley 204 moving on the tracks and the low elevated system plane carrier 206 moving between the group of tracks are arranged in parallel along the first direction. It should be noted that, all of the low elevated tracks 202, the low elevated system lifting trolley 204 and the low elevated system plane carrier 206 are disposed in the position that can be reached by the trolley of the quayside container crane, that is, below the track of the trolley of the quayside container crane.

According to an embodiment, the low elevated system 200 further comprises reserve low elevated tracks, reserve low elevated system lifting trolleys and reserve low elevated system plane carriers. The reserve low elevated tracks, reserve low elevated system lifting trolleys and reserve low elevated system plane carriers should also be disposed in the position that can be reached by the trolley of the quayside container crane. The reserve low elevated tracks, reserve low elevated system lifting trolleys and reserve low elevated system plane carriers can be used to accelerate the loading/unloading speed and efficient of the container wharf when the loading/unloading operation is busy, the yard is far from the quayside container crane so that the operation speed of the low elevated system and the transportation system can not reach the operation speed of the quayside container crane, or one of the low elevated track or the low elevated system lifting trolley or the low elevated system plane carrier thereon malfunctions.

Also according to an embodiment, the low elevated system is arranged to make the quayside container crane have a space to directly operate with trucks below the crane. Generally, the space for operating with trucks is disposed near the quayside and the low elevated system 200 is disposed near the yard, and the reserve low elevated tracks, reserve low elevated system lifting trolleys and reserve low elevated system plane carriers are disposed most close to the yard.

Transportation Carrier System

Figure 1:
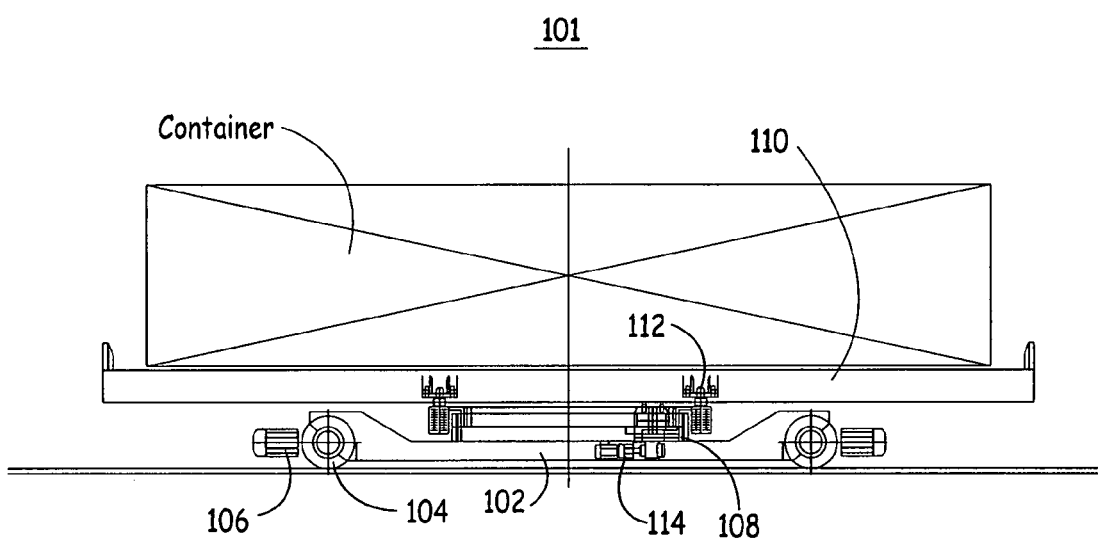
FIG. 1 is a side view of the transportation carrier according to an embodiment of the present invention.
Figure 2:
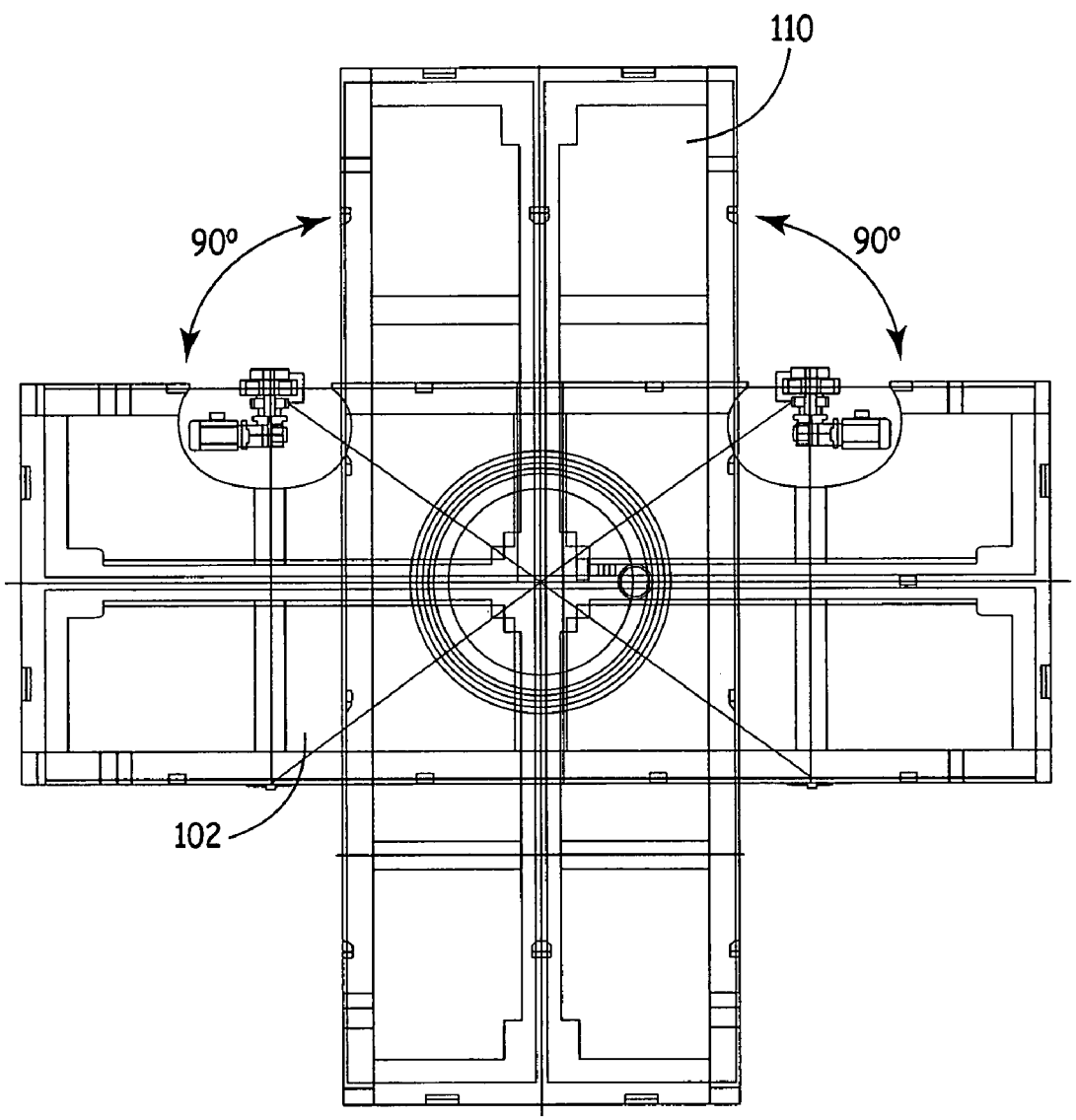
FIG. 2 is a plane view of the transportation carrier according to an embodiment of the present invention, which shows operation principle of the rotary mechanism.
Figure 3:
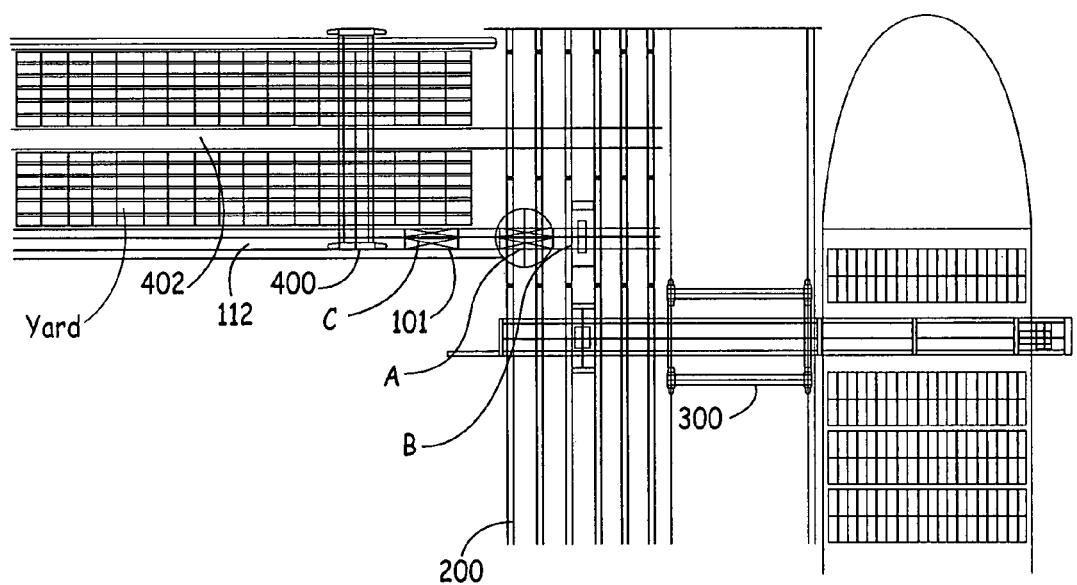
FIG. 3 shows the operation principle of the transportation carriers system according to an embodiment of the present invention.
Figure 4A:
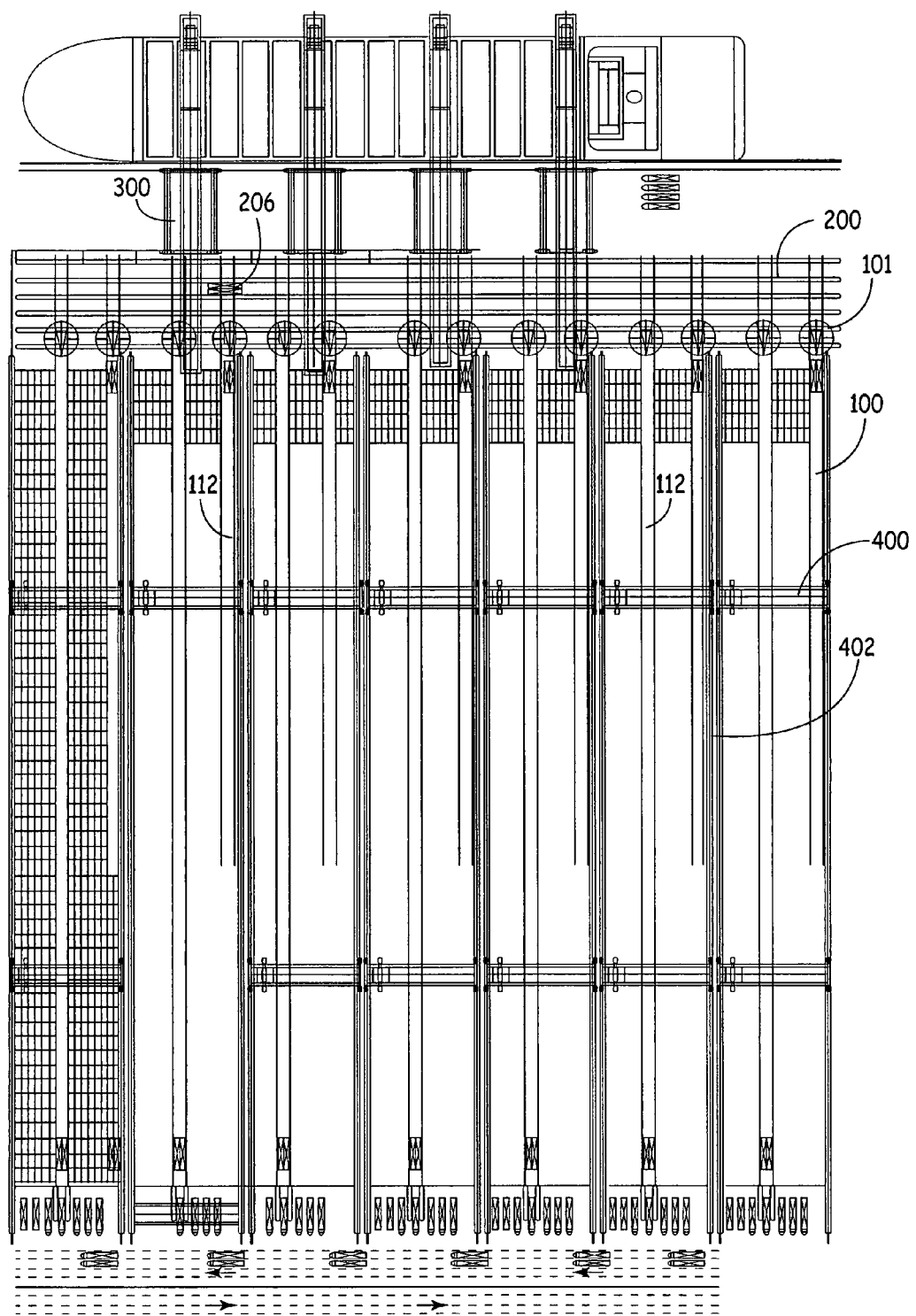
FIGS. 4A and 4B show an arrangement scheme of a container wharf according to an embodiment of the present invention.
Figure 4B:
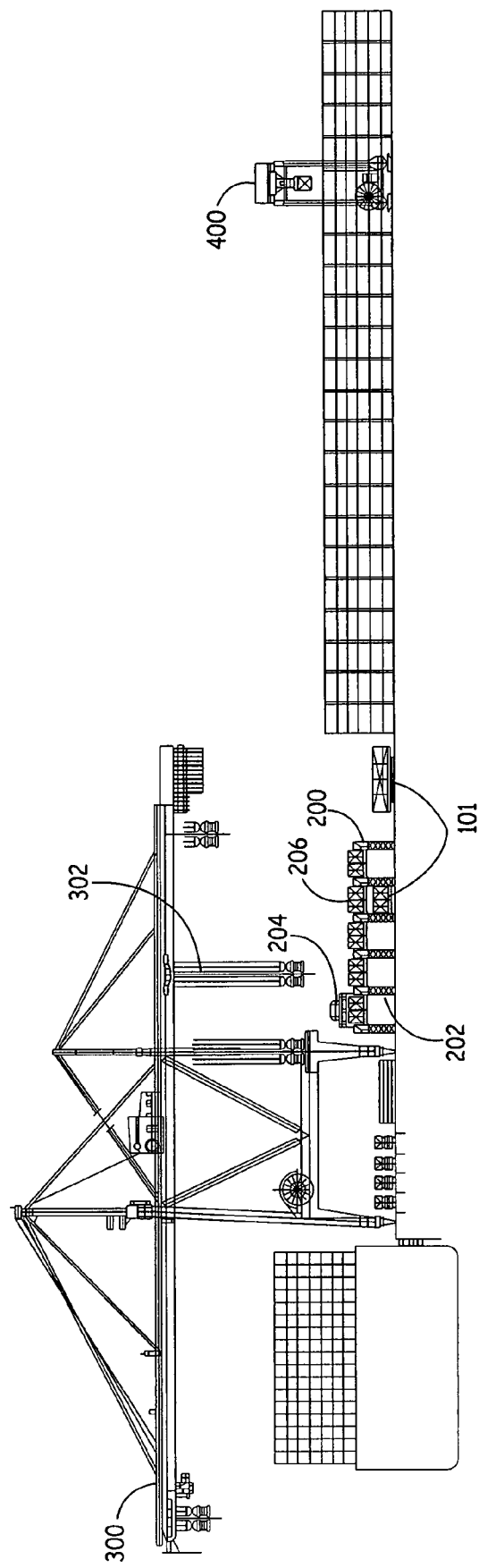

Refer to FIG. 1 to FIG. 3, which show the transportation system according to an embodiment of the present invention, wherein FIG. 1 is the side view of the transportation carrier, FIG. 2 is the plane view of the transportation carrier and shows the operation principle of the rotary mechanism, and FIG. 3 shows the operation principle of the transportation carrier system. As shown in figures, the transportation carrier system comprises a transportation carrier 101, comprising:

a bottom frame 102;

a set of wheels 104, mounted on the bottom frame 102, the set of wheels 104 being positioned on a set of tracks so that the container transportation trolley 100 travels along the tracks. According to an embodiment, the set of wheels comprises four sets of wheels, being positioned in four vertices of the bottom frame 102, respectively. More sets of wheels and different arrangement of the sets of wheels may be used. For example, more sets of wheels can be arranged on both sides of the bottom frame 102, which is also in the scope of the present invention;

a wheel driving means 106, mounted on the bottom frame 102, for driving the set of wheels 104. The driving means 106 may be a single driving device with greater power, or small driving devices mounted on the set of wheels 104, respectively. For example, in the embodiment as shown, four driving devices 106 respectively mounted on four sets of wheels are used. For the sake of environmental protection, electric, fluid or aerodynamic driving is used as driving means;

a rotary mechanism 108, mounted on the bottom frame 102, being rotatable with respect to the bottom frame;

a rotary platform 110, spanned on the rotary mechanism 108 by rotary supporting means 112, with containers positioned on the rotary platform 110. Referring to the embodiment as shown, it can be seen that the size of the rotary platform 110 is substantially designed based on the size of containers, and it is generally shaped as rectangle. Also, the bottom frame 102 is usually rectangular, with size smaller than that of the rotary platform 110. The rotary mechanism 108 as shown in the embodiment is cylindrical, at center of the bottom frame 102 which aligns with the center of the rotary platform 110. The rotary mechanism 108 may rotate clockwise or counter-clockwise, and rotate by 90 degrees each time in consideration of actual application. While the rotary mechanism 108 is shown as cylinder, other shape may be used for the rotary mechanism, for example, hexagon, squareness, ellipse, irregular polygon and etc. may be used as long as the mechanism can be rotated. In the embodiment, the rotary supporting means 112 comprises four supporting pieces at quartering points of circumference of the cylindrical rotary mechanism 108. As such, the rotary supporting means can be formed by other means;

a rotary driving means 114, mounted on the bottom frame 102, for driving the rotary mechanism 108 to rotate the rotary platform 110.

By the above rotary mechanism, rotary platform and rotary driving means, clockwise or counter-clockwise rotation by 90 degrees of the rotary platform with respect to the bottom frame can be implemented, so that containers positioned on the rotary platform are subject to rotation by 90 degrees and rotation for arrangement between front of wharf and the container yard at rear of wharf.

The transportation carrier may be in single use as vehicle for ground transportation. Preferably, the transportation carrier is used with the transportation carrier system of the present invention, and more preferably, the transportation carrier is used with the whole arrangement scheme of wharf of the present invention.

For the condition that the transportation carrier is used with the transportation carrier system, the transportation carrier system 100 also comprises transportation carrier tracks 112, the transportation carrier tracks 112 is along the second direction that is parallel with the containers on the yard. The transportation carrier tracks 112 can extend into the yard or just extend to the outside end of the yard in different arrangement schemes of the container wharf.

The transportation carrier system establishes the connection between the low elevated system and the yard. In the loading process, the yard crane hoists containers from the container yard to the rotary platform of the transportation carrier 101. Such operation can be implemented by the yard crane moving along the yard crane track to the position upper the transportation carrier 101, or the transportation carrier moving along the transportation carrier track 112 to the position below the yard crane. The condition that the transportation carrier track 112 extends into the yard (refer to FIG. 3) will be used as the example here below. At the position C in FIG. 3, the yard crane handles containers onto the rotary platform of the carrier 101, and then the carrier travels along the transportation carrier track 112 to a position (position B in FIG. 3) below the low elevated system 200. The direction of the containers in the low elevated system should along the first direction, that is, perpendicular to the current direction of the containers. At that time, by the rotary mechanism, rotary platform and rotary driving means, the rotary platform rotate containers clockwise or counter-clockwise by 90 degrees so that the direction of containers is along the first direction (refer to position A in FIG. 3). Then the low elevated system lifting trolley 204 of the low elevated system 200 hoists the containers onto the low elevated system plane carrier 206, and the low elevated system plane carrier 206 moves along the low elevated track 202 to the position below the quayside container crane and the containers be loaded to the ship by the quayside container crane. It shall be clarified that the process of rotation may be performed at any time after the transportation carrier 101 travels out of the area of r yard and before it reaches the position below the low elevated system 200, e.g. between position A and position B as shown in FIG. 3. The rotation may be performed at the process of traveling of the transportation carrier 101 or when the transportation carrier 101 stops. For the unloading process, the above flow will be inversed and the detailed steps will be omitted.

Quayside Container Crane

The quayside container crane used in the present invention could be any type of quayside container crane that is presently used, the quayside container crane has trolleys for loading/unloading the containers with the ship and the low elevated system. The applicant of the present invention has filed several application for the improved quayside container cranes and all of them could be used in the arrangement scheme of the present invention.

For example, an ordinary quayside crane has one trolley for implementing the operation of the containers with the ship and the low elevated system.

For the purpose of increasing the loading/unloading efficiency, the applicant of the present invention has provided a quayside container crane having two trolleys, the two trolleys can work simultaneously and will dramatically increase the operation efficiency. Such a quayside container crane having two trolleys can also be applied to the present invention.

To further increase the loading/unloading efficiency, the applicant has also provided a quayside container crane having a upper trolley and a lower trolley. Such quayside container crane has a upper trolley moving along the upper track and a lower trolley moving along the lower track. The upper trolley mounted on the upper track of the large beam and travels along the track. The upper track is arranged on the front and back large beams of the crane and the height of the rail is the normal height of the conventional crane, the upper trolley performs loading/unloading of the containers between the ship and the intermediate transfer platform. The lower trolley is mounted on the lower track of the gate frame transverse beam and travels along the track, the height position of the lower track is close to the ground and the low elevated system. The low trolley performs loading/unloading of the containers between the trucks, the low elevated system and the intermediate transfer platform.

An intermediate transfer platform having container locations is arranged at the optimum position under the gate frame transverse beam. The upper trolley can lift and transfer two 40 foot containers on the ship side by side to the intermediate transfer platform simultaneously along the operation track, or the upper trolley can lift and transfer two 40 foot containers on the intermediate transfer platform side by side to the ship simultaneously. Since the upper trolley can lift two 40 foot containers at a time, the productive efficiency of the crane will be two times of the conventional crane. The upper trolley can also load and unload four 20 foot containers at a time, or one 40 foot container and two 20 foot containers at a time. Of course, the upper trolley of the present invention may load and unload one 20 foot container, or one 40 foot container, or one 45 foot container, or one 53 foot container as the conventional crane does.

The lower trolley can lift and transfer the containers on the intermediate transfer platform to the low elevated system or trucks one by one, or the lower trolley can lift and transfer the containers from the trucks or low elevated system to the intermediate transfer platform one by one. The low track is arranged by using the structural feature of the crane itself wisely such that the height of the low track from the ground is decreased significantly, the operation distance of the trolley is shortened, therefore, the lower trolley has the optimum lifting height and operation distance, the alignment between the crane and the trucks is easy, the swing of the loading and unloading orientation is prevented, and the speed and the efficiency of the loading and unloading are increased.

All-automatic operation without manual manipulation may be used by the relay operation of the two carriers using the intermediate transfer platform, the combined operation model of the manual manipulation and the remote manipulation may be used according to the requirement of the user. The intermediate transfer platform can implement installation and uninstallation of the four corner lock pins of the container except the intermediate transfer relay function of the two carriers, the installation and uninstallation of the four corner lock pins of the container can be completed on the intermediate transfer platform by the worker, that is, the installation and uninstallation time of the corner lock pins of the container does not occupy the operation cycle time by virtue of the time difference of the relay operation of the two carriers so that the loading and unloading efficiency of the crane is increased. In the operation of the conventional crane, the installation and uninstallation of the corner lock pins of the container is carried out by the worker on the ground when the carrier hanging the container is adjacent to the ground, and the carrier may come into next cycle only after the installation and uninstallation of the corner lock pins of the container has been completed by the worker. In the operation of the crane of the invention, after the front carrier of the crane has lifted and transmitted the container onto the intermediate transfer platform, the front carrier may leave and come into next cycle immediately so that the time of taking out the lock pins in the front carrier operation cycle is omitted. Using the quayside container crane having a high efficiency can increase the whole efficiency of the container wharf. However, it should be noted that any exist quayside container cranes and the developing quayside container cranes can be applied to the arrangement scheme of the container wharf of the present invention, the present invention concerns the container wharf, not the quayside container crane.

Yard Crane

The yard crane 400 of the present invention could be an ordinary gantry crane, such a gantry crane is well known and widely used in the art, and the operating efficiency of different types of gantry cranes is almost the same. Therefore, the yard crane will not be detailed described here.

The First Embodiment of the Arrangement Scheme of the Container Wharf

The most important point of the present invention is to provide an arrangement scheme of the container wharf, in which the containers positioned in the yard is arranged in a direction being perpendicular to the direction of the containers positioned in the ship, refer to FIGS. 4-7, they show the first arrangement scheme of the container wharf of the present invention, the scheme comprises:

A quayside container crane 300 such as the quayside container crane 300 mentioned above. The crane 300 has trolleys 302 for loading/unloading the containers with the ship and loading/unloading the containers with the low elevated system 200, wherein the containers positioned in the ship are arranged in the first direction and are kept in the first direction during the operation of the quayside container crane 300, the trolleys 302 of the quayside container crane 300 move along a second direction that is perpendicular to the first direction. It should be noted that, the tracks of the trolleys 302 should extend to the position over the low elevated tracks 202 of the low elevated system 200 and cover all of the low elevated tracks 202. So that the trolleys 302 can operate with all of the low elevated system plane carriers 206 of the low elevated system. An ordinary quayside container crane is shown as an example of the quayside container crane 300 here, and for the condition that the quayside container crane has more trolleys, it would be obvious to one of the ordinary skill in the art that the present invention would also be implemented by arranging the tracks of the trolleys suitably.

A low elevated system 200, such as the low elevated system 200 as mentioned above, including at least one group of low elevated track 202 along the first direction, and said at least one group of low elevated track 202 including at least one low elevated system lifting trolley 204 moving along the low elevated track for loading/uploading the containers with the low elevated system plane carriers 206 being positioned between each group of the low elevated track 202, wherein the low elevated track 202 is configured to make the low elevated system plane carriers 206 be able to reach the position that the containers can be operated by the trolleys 302 of the quayside container crane 300. Generally, the number of the low elevated tracks 202, the low elevated system lifting trolleys 204 and the low elevated system plane carriers 206 of the low elevated system 200 is equal to the number of the quayside container crane. One group of the low elevated tracks 202, one low elevated system lifting trolley 204 moving on the tracks and one low elevated system plane carrier 206 moving between the group of tracks serve one quayside container crane and are used specially for the loading/unloading operation of the quayside container crane. The groups of the low elevated tracks 202, the low elevated system lifting trolley 204 moving on the tracks and the low elevated system plane carrier 206 moving between the group of tracks are arranged in parallel along the first direction. It should be noted that, all of the low elevated tracks 202, the low elevated system lifting trolley 204 and the low elevated system plane carrier 206 are disposed in the position that can be reached by the trolley of the quayside container crane, that is, below the track of the trolley of the quayside container crane. Preferably, the low elevated system 200 further comprises reserve low elevated tracks, reserve low elevated system lifting trolleys and reserve low elevated system plane carriers. The reserve low elevated tracks, reserve low elevated system lifting trolleys and reserve low elevated system plane carriers should also be disposed in the position that can be reached by the trolley of the quayside container crane. The reserve low elevated tracks, reserve low elevated system lifting trolleys and reserve low elevated system plane carriers can be used to accelerate the loading/unloading speed and efficient of the container wharf when the loading/unloading operation is busy, the yard is far from the quayside container crane so that the operation speed of the low elevated system and the transportation system can not reach the operation speed of the quayside container crane, or one of the low elevated track or the low elevated system lifting trolley or the low elevated system plane carrier thereon malfunctions. Preferably, the low elevated system is arranged to make the quayside container crane have a space to directly operate with trucks below the crane. Generally, the space for operating with trucks is disposed near the quayside and the low elevated system 200 is disposed near the yard, and the reserve low elevated tracks, reserve low elevated system lifting trolleys and reserve low elevated system plane carriers are disposed most close to the yard.

A transportation carriers system 100, including at least one group of transportation carrier track 112 along the second direction, wherein the transportation carrier track 112 aligns with the channels between containers in the yard and extends through the yard, the transportation carrier track 112 also extends to the position below the low elevated system 200, the transportation carriers system 100 also includes the transportation carriers 101 moving along the transportation carrier track 112 and being able to rotate 90 degrees together with container put thereon, the transportation carrier track 112 is configured to make the transportation carriers 101 be able to reach the position that containers can be operated by the low elevated system lifting trolley 204, the transportation carrier track 112 is also configured to make the transportation carriers 101 and the low elevated system plane carriers 206 have a different altitude to prevent collision of the transportation carriers 101 and the low elevated system plane carriers 206. The transportation carrier system establishes the connection between the low elevated system and the yard. In the loading process, the yard crane hoists containers from the container yard to the rotary platform of the transportation carrier 101. Such operation can be implemented by the yard crane moving along the yard crane track to the position upper the transportation carrier 101, or the transportation carrier moving along the transportation carrier track 112 to the position below the yard crane. The this embodiment, the transportation carrier track 112 extends into the yard, so the yard crane handles containers onto the rotary platform of the carrier 101, and then the carrier travels along the transportation carrier track 112 to a position below the low elevated system 200. The direction of the containers in the low elevated system should along the first direction, that is, perpendicular to the current direction of the containers. At that time, by the rotary mechanism, rotary platform and rotary driving means, the rotary platform rotate containers clockwise or counter-clockwise by 90 degrees so that the direction of containers is along the first direction. Then the low elevated system lifting trolley 204 of the low elevated system 200 hoists the containers onto the low elevated system plane carrier 206, and the low elevated system plane carrier 206 moves along the low elevated track 202 to the position below the quayside container crane and the containers be loaded to the ship by the quayside container crane. It shall be clarified that the process of rotation may be performed at any time after the transportation carrier 101 travels out of the area of r yard and before it reaches the position below the low elevated system 200. The rotation may be performed at the process of traveling of the transportation carrier 101 or when the transportation carrier 101 stops. For the unloading process, the above flow will be inversed and the detailed steps will be omitted.

Figure 6:
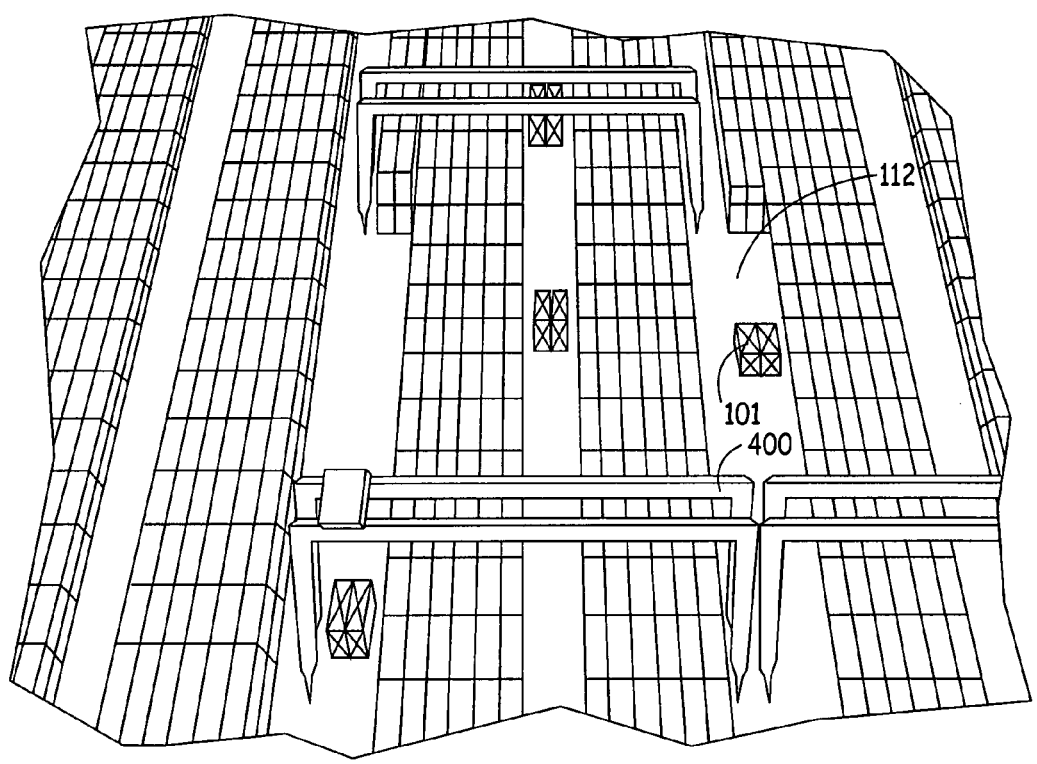
FIG. 6 shows the arrangement of the container yard according to an embodiment of the present invention.
Figure 7:
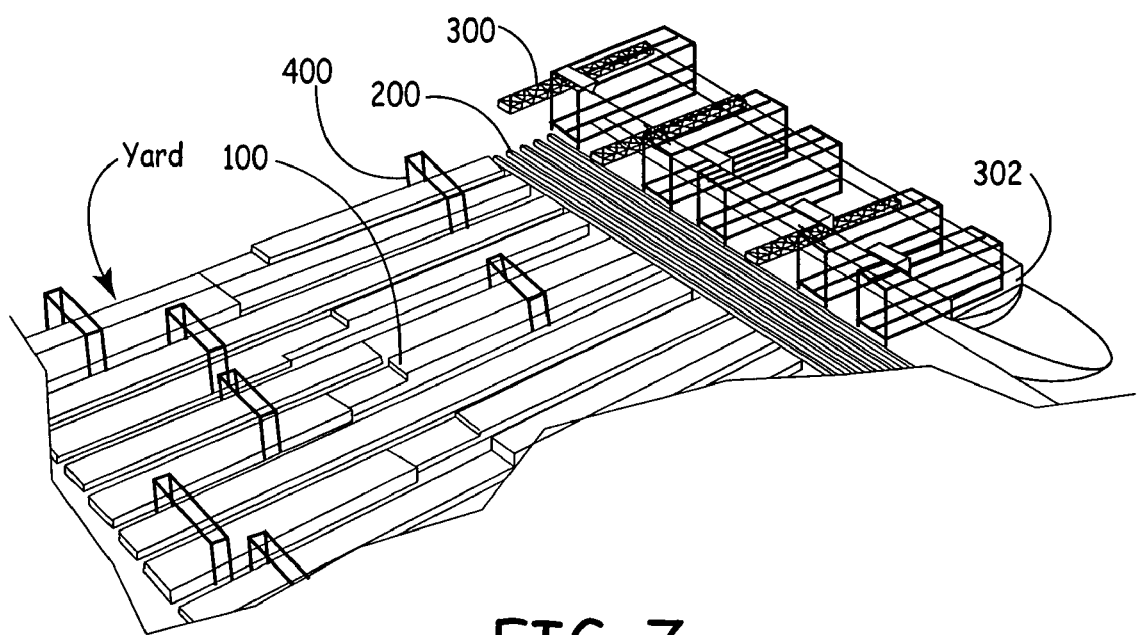
FIG. 7 shows the whole arrangement of a container wharf according to an embodiment of the present invention.

A yard crane 400, such as the yard crane 400 mentioned above, the yard crane has yard crane track 402 along the second direction and moving on the yard crane track 402, the containers positioned in the yard are arranged in the second direction and can be operated by the yard crane 400, wherein the yard crane track 402 is configured to make the yard crane 400 be able to reach the position for the containers to be operated by the transportation carriers 101. According to this arrangement scheme, the transportation carrier track 112 extends into the channel of the yard and goes through the yard, then the yard crane track 402 can have a relatively short length. The transportation carrier 101 will move more distance to perform the transfer of the containers between the transportation system and the yard. It should be noted that, the transportation carrier tracks must go through below the yard container 400. As shown in FIG. 6, according to this arrangement scheme, the yard container should have a long span, for example, one yard container will span over two rows of containers and the channel between the two rows can be utilized by the transportation carrier track 112.

The operating principle of the container wharf is shown as follows:

when loading the containers to the ship, the yard crane lifts the containers being arranged in the second direction from the yard, the transportation carriers move along the transportation track to the position below the yard crane, the yard crane then put the container on the transportation carriers, the transportation carriers move along the transportation track to the position below the low elevated system and rotate 90 degrees to make the containers in the first direction, the low elevated system lifting trolley lifts the containers to the low elevated system plane carriers and the low elevated system plane carriers move along the low elevated track to the position below the trolley of the quayside container crane, the trolley of the quayside container crane lifts the containers from the low elevated system plane carriers and loads them to the ship;

when unloading the containers from the ship, the trolley of the quayside container crane lifts the containers being arranged in the first direction from the ship and put them on the low elevated system plane carriers, the low elevated system plane carriers move along the low elevated track to the position for transferring the containers to the transportation carriers and lifts the containers to the transportation carriers by the low elevated system lifting trolley, then the transportation carriers rotate 90 degrees and make the containers in the second direction and move along the transportation carrier track to the position below the yard crane, the yard crane lifts the containers from the transportation carriers and put them in the yard.

The second embodiment of the arrangement scheme of the container wharf

Figure 9:
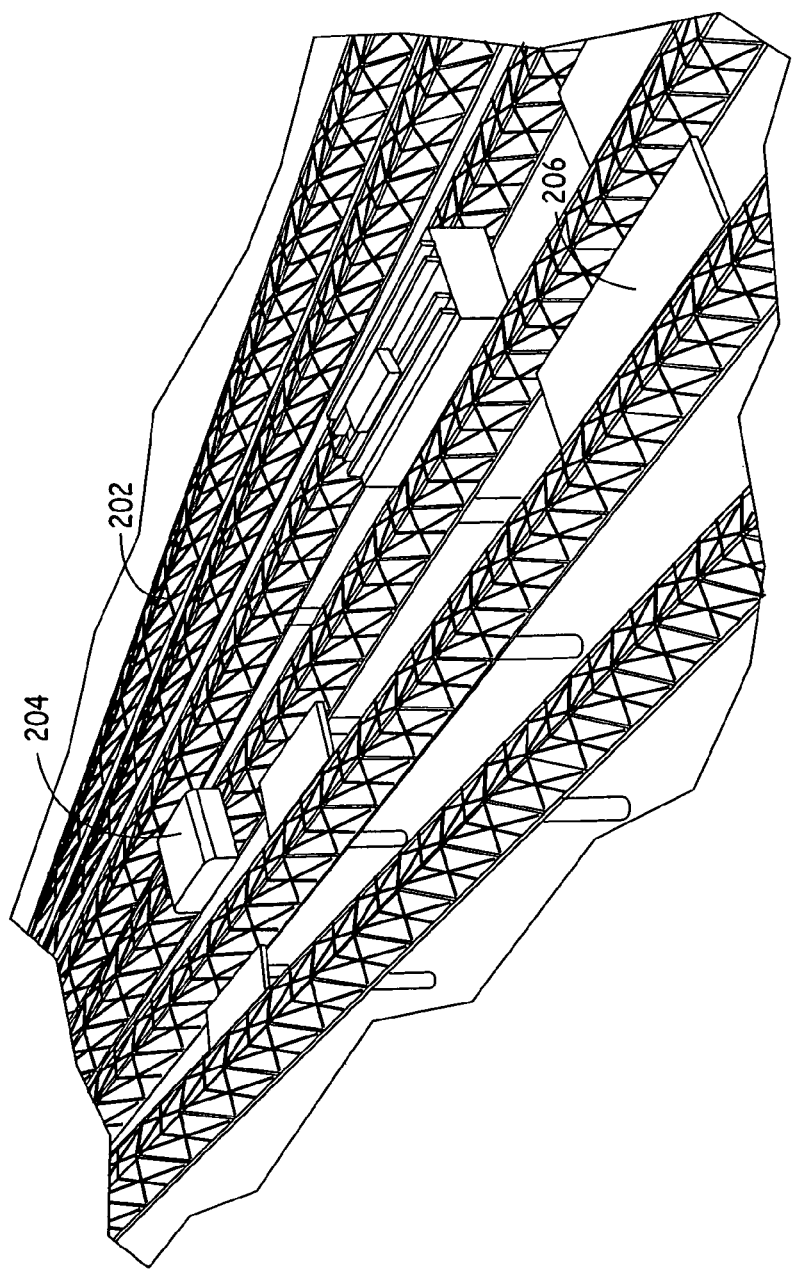
FIG. 9 shows the low elevated system according to another embodiment of the present invention.
Figure 10:
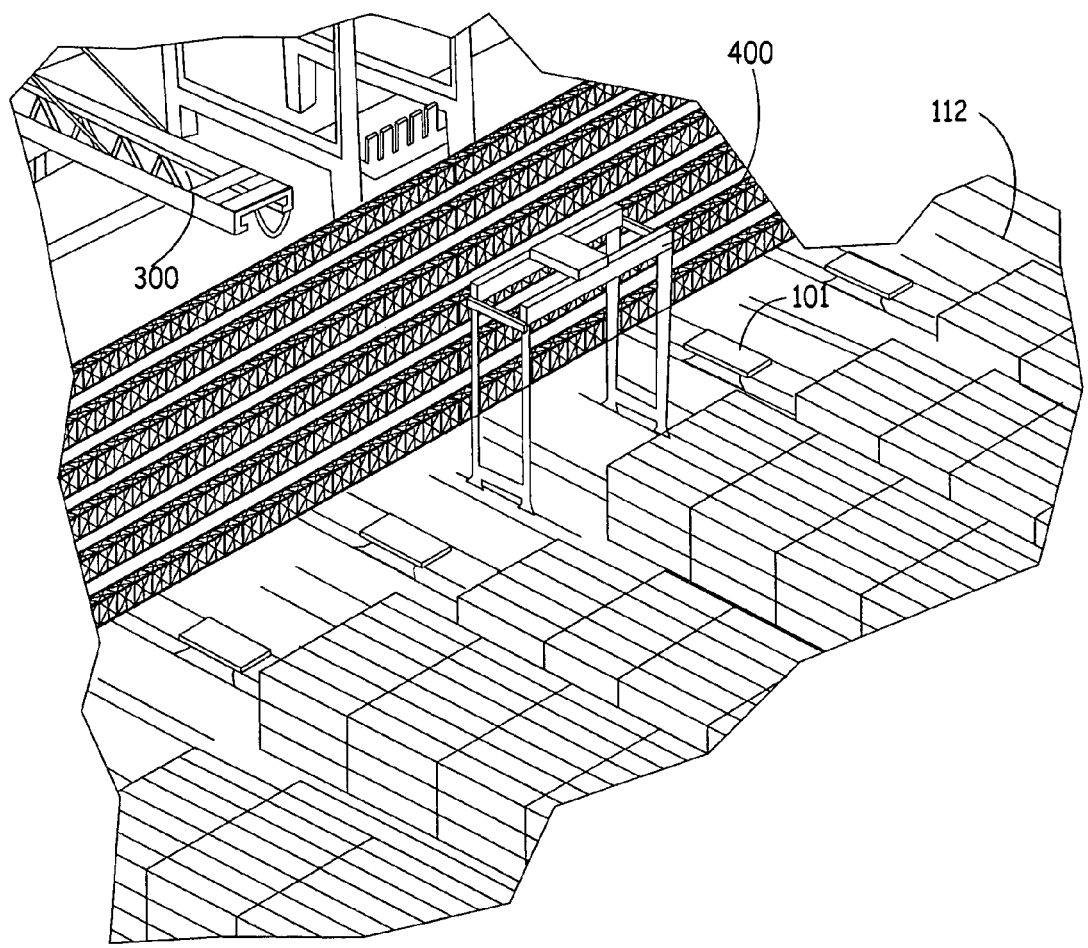
FIG. 10 shows the arrangement of the container yard according to another embodiment of the present invention.
Figure 11:
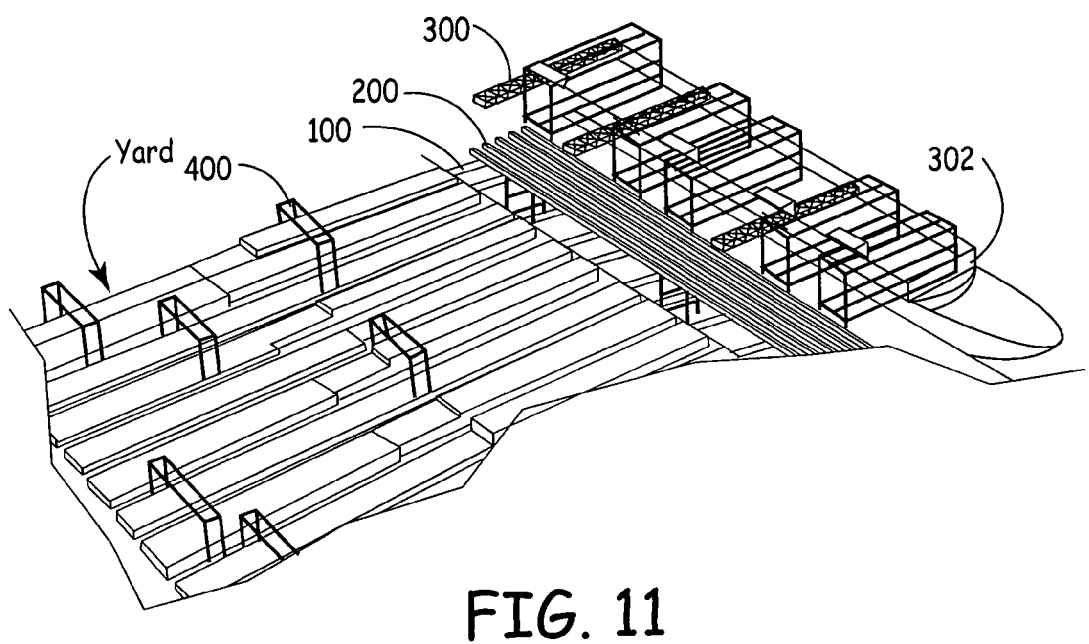
FIG. 11 shows the whole arrangement of a container wharf according to another embodiment of the present invention.

According to the present invention, providing another arrangement scheme of the container wharf, in which the containers positioned in the yard is arranged in a direction being perpendicular to the direction of the containers positioned in the ship, refer to FIGS. 9-11, they show the second arrangement scheme of the container wharf of the present invention, the scheme comprises:

A quayside container crane 300 such as the quayside container crane 300 mentioned above. The crane 300 has trolleys 302 for loading/unloading the containers with the ship and loading/unloading the containers with the low elevated system 200, wherein the containers positioned in the ship are arranged in the first direction and are kept in the first direction during the operation of the quayside container crane 300, the trolleys 302 of the quayside container crane 300 move along a second direction that is perpendicular to the first direction. It should be noted that, the tracks of the trolleys 302 should extend to the position over the low elevated tracks 202 of the low elevated system 200 and cover all of the low elevated tracks 202. So that the trolleys 302 can operate with all of the low elevated system plane carriers 206 of the low elevated system. An ordinary quayside container crane is shown as an example of the quayside container crane 300 here, and for the condition that the quayside container crane has more trolleys, it would be obvious to one of the ordinary skill in the art that the present invention would also be implemented by arranging the tracks of the trolleys suitably.

A low elevated system 200, such as the low elevated system 200 as mentioned above, including at least one group of low elevated track 202 along the first direction, and said at least one group of low elevated track 202 including at least one low elevated system lifting trolley 204 moving along the low elevated track for loading/uploading the containers with the low elevated system plane carriers 206 being positioned between each group of the low elevated track 202, wherein the low elevated track 202 is configured to make the low elevated system plane carriers 206 be able to reach the position that the containers can be operated by the trolleys 302 of the quayside container crane 300. Generally, the number of the low elevated tracks 202, the low elevated system lifting trolleys 204 and the low elevated system plane carriers 206 of the low elevated system 200 is equal to the number of the quayside container crane. One group of the low elevated tracks 202, one low elevated system lifting trolley 204 moving on the tracks and one low elevated system plane carrier 206 moving between the group of tracks serve one quayside container crane and are used specially for the loading/unloading operation of the quayside container crane. The groups of the low elevated tracks 202, the low elevated system lifting trolley 204 moving on the tracks and the low elevated system plane carrier 206 moving between the group of tracks are arranged in parallel along the first direction. It should be noted that, all of the low elevated tracks 202, the low elevated system lifting trolley 204 and the low elevated system plane carrier 206 are disposed in the position that can be reached by the trolley of the quayside container crane, that is, below the track of the trolley of the quayside container crane. Preferably, the low elevated system 200 further comprises reserve low elevated tracks, reserve low elevated system lifting trolleys and reserve low elevated system plane carriers. The reserve low elevated tracks, reserve low elevated system lifting trolleys and reserve low elevated system plane carriers should also be disposed in the position that can be reached by the trolley of the quayside container crane. The reserve low elevated tracks, reserve low elevated system lifting trolleys and reserve low elevated system plane carriers can be used to accelerate the loading/unloading speed and efficient of the container wharf when the loading/unloading operation is busy, the yard is far from the quayside container crane so that the operation speed of the low elevated system and the transportation system can not reach the operation speed of the quayside container crane, or one of the low elevated track or the low elevated system lifting trolley or the low elevated system plane carrier thereon malfunctions. Preferably, the low elevated system is arranged to make the quayside container crane have a space to directly operate with trucks below the crane. Generally, the space for operating with trucks is disposed near the quayside and the low elevated system 200 is disposed near the yard, and the reserve low elevated tracks, reserve low elevated system lifting trolleys and reserve low elevated system plane carriers are disposed most close to the yard.

A transportation carriers system 100, including at least one group of transportation carrier track 112 along the second direction, wherein the transportation carrier track 112 aligns with the containers in the yard and extends to one end of the yard but do not enter the yard, the transportation carrier track 112 also extends to the position below the low elevated system 200, the transportation carriers system 100 also includes the transportation carriers 101 moving along the transportation carrier track 112 and being able to rotate 90 degrees together with container put thereon, the transportation carrier track 112 is configured to make the transportation carriers 101 be able to reach the position that containers can be operated by the low elevated system lifting trolley 204, the transportation carrier track 112 is also configured to make the transportation carriers 101 and the low elevated system plane carriers 206 have a different altitude to prevent collision of the transportation carriers 101 and the low elevated system plane carriers 206. The transportation carrier system establishes the connection between the low elevated system and the yard. In the loading process, the yard crane hoists containers from the container yard to the rotary platform of the transportation carrier 101. Such operation can be implemented by the yard crane moving along the yard crane track to the position upper the transportation carrier 101, or the transportation carrier moving along the transportation carrier track 112 to the position below the yard crane. The this embodiment, the transportation carrier track 112 extends into the yard, so the yard crane handles containers onto the rotary platform of the carrier 101, and then the carrier travels along the transportation carrier track 112 to a position below the low elevated system 200. The direction of the containers in the low elevated system should along the first direction, that is, perpendicular to the current direction of the containers. At that time, by the rotary mechanism, rotary platform and rotary driving means, the rotary platform rotate containers clockwise or counterclockwise by 90 degrees so that the direction of containers is along the first direction. Then the low elevated system lifting trolley 204 of the low elevated system 200 hoists the containers onto the low elevated system plane carrier 206, and the low elevated system plane carrier 206 moves along the low elevated track 202 to the position below the quayside container crane and the containers be loaded to the ship by the quayside container crane. It shall be clarified that the process of rotation may be performed at any time after the transportation carrier 101 travels out of the area of r yard and before it reaches the position below the low elevated system 200. The rotation may be performed at the process of traveling of the transportation carrier 101 or when the transportation carrier 101 stops. For the unloading process, the above flow will be inversed and the detailed steps will be omitted.

A yard crane 400, such as the yard crane 400 mentioned above, the yard crane has yard crane track 402 along the second direction and moving on the yard crane track 402, the containers positioned in the yard are arranged in the second direction and can be operated by the yard crane 400, wherein the yard crane track 402 is configured to make the yard crane 400 be able to reach the position for the containers to be operated by the transportation carriers 101. According to this arrangement scheme, the transportation carrier track 112 does not extend into the channel of the yard and just extends to the outside end of the yard, then the yard crane track 402 can have a relatively long length. The yard crane 400 will move more distance along the to yard crane track 402 to the position over the transportation carriers 101 to perform the transfer of the containers between the transportation system and the yard. It should be noted that, according to this arrangement scheme, the transportation carrier tracks 112 is always below the yard container 400 since it aligns the containers in the yard. As shown in FIG. 9, according to this arrangement scheme, the yard container may have a short span, for example, one yard container will span over one row of containers and transportation carrier track 112 aligns the row of the containers.

The operating principle of the container wharf is shown as follows:

when loading the containers to the ship, the yard crane lifts the containers being arranged in the second direction from the yard, the transportation carriers move along the transportation track to the position below the yard crane, the yard crane then put the container on the transportation carriers, the transportation carriers move along the transportation track to the position below the low elevated system and rotate 90 degrees to make the containers in the first direction, the low elevated system lifting trolley lifts the containers to the low elevated system plane carriers and the low elevated system plane carriers move along the low elevated track to the position below the trolley of the quayside container crane, the trolley of the quayside container crane lifts the containers from the low elevated system plane carriers and loads them to the ship;

when unloading the containers from the ship, the trolley of the quayside container crane lifts the containers being arranged in the first direction from the ship and put them on the low elevated system plane carriers, the low elevated system plane carriers move along the low elevated track to the position for transferring the containers to the transportation carriers and lifts the containers to the transportation carriers by the low elevated system lifting trolley, then the transportation carriers rotate 90 degrees and make the containers in the second direction and move along the transportation carrier track to the position below the yard crane, the yard crane lifts the containers from the transportation carriers and put them in the yard.

Container Loading/Unloading Process

According to the present invention, also providing a container loading/unloading process of a container wharf, wherein the container wharf is arranged according to the arrangement scheme mentioned above, the process comprising:

the loading process, the yard crane lifts the containers being arranged in the second direction from the yard;

the transportation carriers moves along the transportation carrier track, or the yard crane moves along the yard crane track, or the transportation carriers and the yard crane moves simultaneously until the transportation carriers reach the position below the yard crane, and the yard crane puts the containers on the transportation carriers;

the transportation moves along the transportation carrier track to the position under the low elevated system track and rotate 90 degrees to make the containers in the first direction;

the low elevated system lifting trolley lifts the containers to the low elevated system plane carriers, and the low elevated system plane carriers move along the low elevated track to the position under the trolley of the quayside container crane;

the trolley of the quayside container crane lifts the containers from the low elevated system plane carriers and load them to the ship; unloading process, the trolley of the quayside container crane lifts the containers being arranged in the first direction from the ship;

the trolley of the quayside container crane puts the containers to the low elevated system plane carriers, and the low elevated system plane carriers move along the low elevated track to the position for transferring the containers to the transportation carriers;

the low elevated system lifting trolley lifts the containers to the transportation carriers;

the transportation carriers rotate 90 degrees to make the containers in the second direction;

the transportation carriers moves along the transportation carrier track, or the yard crane moves along the yard crane track, or the transportation carriers and the yard crane moves simultaneously until the transportation carriers reach the position below the yard crane;

the yard crane lifts the containers from the transportation carriers and puts them on the yard.

In the loading process, the transportation carriers rotating 90 degrees to make the containers in the first direction can be performed during the time period when the transportation leaves the end of the yard and reaches the position under the low elevated system track, or the rotating step can be performed when the transportation carriers reaches the position under the low elevated system track;

In the unloading process, the transportation carriers rotating 90 degrees to make the containers in the second direction can be performed during the time period when the transportation leaves the position under the low elevated system track and reaches the end of the yard, or the rotating step can be performed when the transportation carriers are at the position under the low elevated system track.

CONCLUSION

The present invention has solved the problem of level transportation of containers at front and rear of wharf at a container wharf by not utilizing conventional level carriers driven by gas engine (container trucks, AGV or straddle carrier), but utilizing electric platform trolleys traveling on tracks. The trolleys may transport containers hoisted by devices at front of wharf to the yard at rear of wharf or transport containers hoisted by devices of the yard at rear of wharf to front of wharf.

The trolley travels on tracks by wheels and is comprised of sets of wheels, wheel driving means, a bottom frame, a rotary platform, rotary driving means and rotary supporting means. Not only single-row 20' containers/double 20' containers/40' containers/45' containers but also double-row 20' containers/double 20' containers/40' containers/45' containers may be positioned on the rotary platform of the trolley, which is mounted on the bottom frame of the trolley by the rotary supporting means, and performs plane rotation on the bottom frame of the trolley by the rotary driving means. The rotary platform may rotate with or without containers.

When loading the containers to the ship, the yard crane hoists the container in the second direction and put them on the transportation carriers moving along the transportation carrier track to the position below the yard container, then the transportation carriers moves along the transportation carrier track and reach the position below the low elevated tracks and rotate the containers by 90 degrees to make the containers in the first direction, then the low elevated system lifting trolley hoists the containers from the transportation carriers to the low elevated system plane carriers, the low elevated system plane carriers travel along the low elevated tracks and reach the position below the trolleys of the quayside container crane, the quayside container crane hoists the containers from the low elevated system plane carriers and loads them on the ship. In the unloading process, the trolley of the quayside container crane lifts the containers being arranged in the first direction from the ship; the trolley of the quayside container crane puts the containers to the low elevated system plane carriers, and the low elevated system plane carriers move along the low elevated track to the position for transferring the containers to the transportation carriers; the low elevated system lifting trolley lifts the containers to the transportation carriers; the transportation carriers rotate 90 degrees to make the containers in the second direction; the transportation carriers moves along the transportation carrier track, or the yard crane moves along the yard crane track, or the transportation carriers and the yard crane moves simultaneously until the transportation carriers reach the position below the yard crane; the yard crane lifts the containers from the transportation carriers and puts them on the yard.

Summing up, using the technical solutions of the present invention, the speed of transportation between cranes at shore of container wharf and ones at the container yard will be significantly increased and the problem of 90-degree rotation will be solved. In addition, the handling way can be used at non-automatic wharfs, and, preferably, at automatic wharfs.

The advantage of efficient handling has created a new mode of operation for completely enhancing efficiency and technical level of the container handling port.

The previous description of the disclosed embodiments is provided to enable any person skilled in the art to make or use the present invention. Various modifications to these embodiments will be readily apparent to those skilled in the art and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A loading/unloading system for a container terminal, in which containers positioned in a ship are arranged in a first direction, and containers positioned in a yard are arranged in a second direction perpendicular to the first direction, wherein the loading/unloading system comprises:
 a quayside container crane having trolleys for loading/unloading the containers with the ship and loading/unloading the containers with a low elevated system, wherein the containers positioned in the ship are arranged in the first direction and are kept in the first direction during operation of the quayside container crane, the trolleys of the quayside container crane move along the second direction;
 the low elevated system including at least one group of low elevated tracks along the first direction, and the at least one group of low elevated tracks including at least one low elevated system lifting trolley moving along the at least one group of low elevated tracks for loading/unloading the first plurality of containers with low elevated system plane carriers being positioned on the at least one group of low elevated tracks, wherein the at least one group of low elevated tracks is configured to make the low elevated system plane carriers be able to reach a position that the first and a second plurality of containers can be operated by the trolleys of the quayside container crane;
 a transportation carriers system including at least one group of transportation carrier tracks along the second direction, wherein the at least one group of transportation carrier tracks align with passages between the containers in the yard and extends through the yard, the at least one group of transportation carrier tracks also extends to position below the low elevated system, the transportation carriers system also includes transportation carriers moving along the at least one of transportation carrier tracks and being able to rotate 90 degrees together with a container, the at least one group of transportation carrier tracks is configured to make the transportation carriers be able to reach a position that the first and second containers are operated by the low elevated system lifting trolley, the at least one group of transportation carrier tracks is also configured to make the transportation carriers and the low elevated system plane carriers have a different altitude;
 a yard crane having a yard crane track along the second direction and moving thereon, the containers positioned in the yard being arranged in the second direction and can be operated by the yard crane, wherein the yard crane track is configured to make the yard crane be able to reach a position for the first and second containers to be operated by the transportation carriers;
 wherein when loading the containers to the ship, the yard crane lifts the containers being arranged in the second direction from the yard, the transportation carriers move along the transportation track to the position below the yard crane, the yard crane then put the containers on the transportation carriers, the transportation carriers move along the transportation track to the position below the low elevated system and rotate 90 degrees to make the containers in the first direction, the low elevated system lifting trolley lifts the containers to the low elevated system plane carriers and the low elevated system plane carriers move along the low elevated track to the position below the trolley of the quayside container crane, the trolley of the quayside container crane lifts the containers from the low elevated system plane carriers and loads them to the ship;
 wherein when unloading the containers from the ship, the trolley of the quayside container crane lifts the containers being arranged in the first direction from the ship and put them on the low elevated system plane carriers, the low elevated system plane carriers move along the low elevated track to the position for transferring the containers to the transportation carriers and lifts the containers to the transportation carriers by the low elevated system lifting trolley, then the transportation carriers rotate 90 degrees and make the containers in the second direction and move along the transportation carrier track to the position below the yard crane, the yard crane lifts the containers from the transportation carriers and puts the containers in the yard;
 wherein the transportation carrier comprises:
  a bottom frame;
  a set of wheels, mounted on the bottom frame, the set of wheels being positioned on a set of tracks so that the container transportation trolley travels along the set of tracks;
  a wheel driving means, mounted on the bottom frame, for driving said the of wheels;
  a rotary mechanism, mounted on the bottom frame, being rotatable with respect to the bottom frame;
  a rotary platform, spanned on the rotary mechanism by rotary supporting means, with containers positioned on the rotary platform;
  a rotary driving means, mounted on the bottom frame, for driving the rotary mechanism to rotate the rotary platform.

2. The loading/unloading system of claim 1, wherein the wheel driving means is one selected from a group including: electric means, hydraulic power transmission means and aerodynamic means.

3. The loading/unloading system of claim 2, wherein the set of wheels comprises four sets of wheels, positioned at a left side and a right side of the bottom frame, respectively, and
 a distance between the set of tracks is the same as that between the sets of wheels at both sides of the bottom frame.

4. The loading/unloading system of claim 1, wherein the rotary mechanism is cylindrical, being positioned at a center of the bottom frame which aligns with the center of the rotary platform.

5. The loading/unloading system of claim 4, wherein the rotary supporting means comprises supporting pieces at the circumference of the cylindrical rotary mechanism.

6. The loading/unloading system of claim 1, wherein the number of the low elevated tracks, low elevated lifting trolleys and low elevated system plane carries match the number of quayside container cranes, wherein a predetermined number of low elevated tracks, low elevated lifting trolleys and low elevated system plane carries serve one quayside container crane.

7. The loading/unloading system of claim 1, wherein the low elevated system further comprises: a reserve low elevated tracks, the reserve low elevated system lifting trolleys and reserve low elevated system plane carriers.

8. The loading/unloading system of claim 1, wherein the low elevated system is configured to make the quayside container crane be able to load/unload containers with trucks below directly.

9. A container loading/unloading process of a container terminal, wherein the container terminal has a loading/unloading system according to claim 1, the process comprising:

in a loading process,
lifting, by a yard crane, containers being arranged in a second direction from the yard;
a transportation carrier moving along a transportation carrier track, or the yard crane moving along a yard crane track, or the transportation carrier and the yard crane moving simultaneously until the transportation carrier reaching a position below the yard crane, and the yard crane putting the containers on the transportation carrier;
the transportation carrier moving along the transportation carrier track to a position under a low elevated system track and rotating 90 degrees to make the containers in a first direction perpendicular to the second direction;
lifting, by a low elevated system trolley, the containers to a low elevated system plane carrier, and the low elevated system plane carrier moving along a low elevated track to a position under a trolley of a quayside container crane;
lifting, by the trolley of the quayside container crane, the containers from a low elevated system plane carrier and loading them to a ship;

in an unloading process,
lifting, by a trolley of a quayside container crane, containers being arranged in the first direction from a ship;
the trolley of the quayside container crane, putting containers to a low elevated system plane carrier, and the low elevated system plane carrier move along a low elevated track to a position for transferring the containers to a transportation carrier;
lifting, by a low elevated system lifting trolley, the containers to the transportation carrier;
rotating, by the transportation carriers with 90 degrees to make the containers in the second direction;
the transportation carrier moving along the transportation carrier track, or a yard crane moving along a yard crane track, or the transportation carriers and the yard crane moving simultaneously until the transportation carriers reaching a position below the yard crane;
lifting by the yard crane, the containers from the transportation carrier and putting them on the yard;
wherein
in the loading process, the transportation carriers rotating 90 degrees to make the containers in the first direction is performed during a time period when the transportation carrier leaves an end of the yard and reaches a position under the low elevated system track, or performed when the transportation carrier reaches a position under the low elevated system track;
in the unloading process, the transportation carriers rotating 90 degrees to make the containers in the second direction is performed during a time period when a transportation carrier leaves a position under the low elevated system track and reaches an end of the yard, or performed when the transportation carrier is at a position under the low elevated system track.

* * * * *